July 20, 1926.
H. C. PHELPS
PISTON RING COMPRESSOR
Filed August 20, 1924
1,593,220
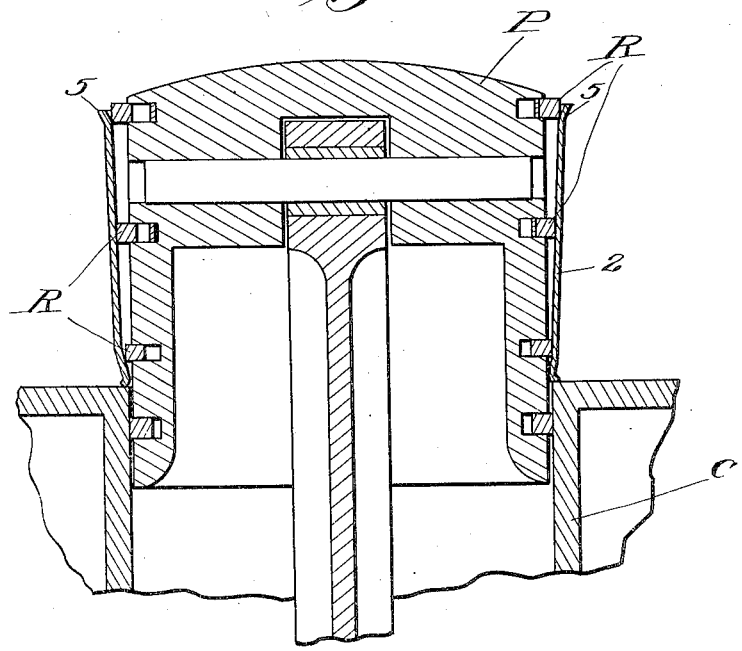
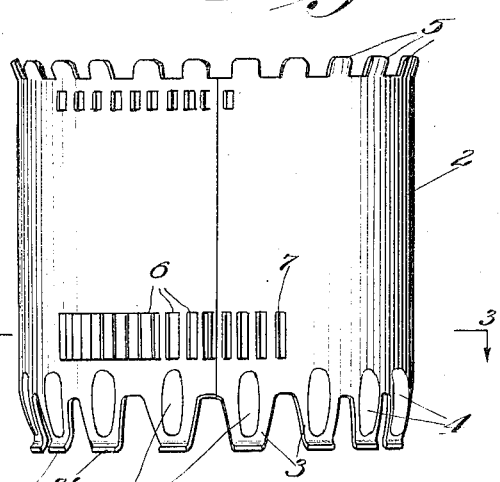
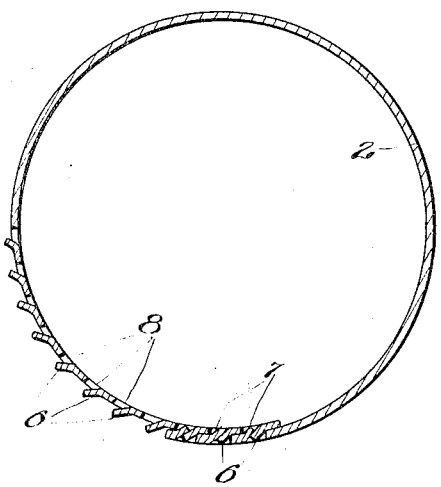
Inventor
Henry C. Phelps
by Hazard and Miller
Attorneys Patented July 20, 1926.

1,593,220

UNITED STATES PATENT OFFICE.

HENRY C. PHELPS, OF BURBANK, CALIFORNIA.

PISTON-RING COMPRESSOR.

Application filed August 20, 1924. Serial No. 733,177.

This invention relates to hand tools and has for its object to provide a tool or implement for facilitating the introduction of piston rings and pistons into the cylinders of internal combustion engines and other piston mechanism. It is an object to provide a piston ring compressor of extremely simple, substantial, practicable and inexpensive form. Another object is to provide a piston ring compressor capable of being readily adjusted or set for the application of piston rings of different diameters.

Other objects and advantages will be made manifest in the following specification of an embodiment of the invention illustrated in the accompanying drawings, wherein—

Figure 1 is a side elevation of the improved piston ring compressor.

Fig. 2 is a vertical central section showing the application of the invention in the process of applying a piston with its piston rings to an engine cylinder.

Fig. 3 is a cross section on line 3—3 of Fig. 1.

Difficulty is commonly experienced in introducing a piston with the piston rings into a cylinder of an engine or other chamber, and the present device has for its function the guiding and compressing of piston rings in the piston.

The device is preferably formed of one piece of sheet metal having a suitable degree of resiliency and is preferably of slightly tapering tubular form forming a shell 2 split longitudinally along one side so that the contiguous longitudinal margins may be overlapped. The end of the shell is notched or cut away peripherally so as to form inwardly bent tongues or prongs 3 which may be slightly embossed as at 4 to provide reinforcement or strengthening. The lower ends of the tongues 3 are toed outwardly as at 3' to form stops when engaging a cylinder head or end. The upper end of the shell is provided with a series of outwardly bent guiding lugs 5 to facilitate the introduction of a piston P and its compressible split piston rings R.

The split shell 2 is adapted to be contracted to an approximately cylindrical form according to the diameter of piston rings to be contracted and means are provided for holding the shell 2 in the desired contracted position. A simple form of such holding means is here shown as providing a series of outwardly struck longitudinally extending lips 6 circumferentially spaced around the shell, and these are designed to interlock with inwardly struck complementary lips 7; the wall of the shell being perforated as at 8 between the several interlocking lips 6 and 7.

From the above it will be seen that with a given size piston P and its rings R to be assembled in the cylinder C, it is only necessary to contract or set the split shell 2 to such a diameter that the foot prongs or tongues 3 can be drawn in close around the piston and will rest upon the upper end of a cylinder C, then the piston P with the inserted piston rings R is pushed downwardly in the upper flaring end of the shell 2, the tapering formation of which serves to gradually compress the piston rings as these slide down with the piston until each ring is contracted into the piston so as to freely pass into the open upper end of the cylinder chamber.

Further embodiments, modifications and changes may be resorted to within the spirit of the invention as here claimed.

What is claimed is:—

1. A piston ring compressor consisting of a shell adapted to be adjusted to fit pistons of different diameters, the shell being longitudinally split so that its marginal portions can be overlapped, one portion of the shell having peripherally arranged perforations and the other portion being provided with integral tongues extending diagonally with reference to a diameter of the shell so that the tongues are adapted to automatically enter the perforations when the shell is contracted, thereby securing the shell in its adjusted condition.

2. A piston ring compressor consisting of a convergent rounded tubular shell longitudinally split and having means for securing the longitudinal marginal portions in contracted interlocked position, said means consisting of one portion of the shell having peripherally arranged perforations and the other portion provided with integral tongues extending diagonally with reference to a diameter of the shell so that the tongues are adapted to automatically enter the perforations when the shell is contracted.

3. A piston ring compressor consisting of a convergent rounded tubular shell longitudinally split and having means for securing the longitudinal marginal portions in contracting interlocked position, said means being comprised of one portion of the shell having peripherally arranged perforations and the other portion being provided with integral tongues extending diagonally with reference to a diameter of the shell whereby the tongues are adapted to automatically enter the perforations when the shell is contracted, the shell having outwardly flaring guide means at its upper end.

4. A piston ring compressor consisting of a convergent rounded tubular shell longitudinally split, one portion of the shell having peripherally arranged perforations and the other portion being provided with integral tongues extending diagonally with reference to a diameter of the shell so that the tongues are adapted to automatically enter the perforations when the shell is contracted and to secure the marginal portions in contracted interlocked position, the shell having integral convergent guide tongues at its lower end.

5. A piston ring compressor consisting of a convergent rounded tubular shell longitudinally split, one portion of the shell having peripherally arranged perforations and the other portion being provided with integral tongues extending diagonally with reference to a diameter of the shell so that the tongues are adapted to automatically enter the perforations when the shell is contracted and to secure the marginal portions in contracted, interlocked position, the shell having integral convergent guide tongues at its lower end, said tongues being reinforced.

6. A piston ring compressor constituting a shell adapted to be adjusted to fit pistons of different diameter, the shell being longitudinally split so that its marginal portions can be overlapped, both portions of the shell having peripherally arranged pressed perforations extending from the split, the metal from the perforations being pressed to a side to form lips or tongues adapted to engage in the perforations formed in the opposite portion of the shell and thereby hold the shell contracted when the portions are overlapped.

7. A piston ring compressor as claimed in claim 6, in which the lips or tongues are pressed outwardly on one portion of the shell and inwardly on the other portion.

8. A piston ring compressor constituting a shell adapted to be adjusted to fit pistons of different diameters, the shell being split longitudinally so that its marginal portions can be overlapped, a series of lips or tongues formed integral with the two portions of the shell pressed outwardly and inwardly respectively, extending from a position adjacent the split, said lips or tongues being adapted to interlock when the portions of the shell are overlapped and thereby hold the shell contracted to compress the piston rings.

9. A piston ring compressor comprising a shell having a gradual taper from one end to the other, having guiding lugs bent outwardly at the widest end and inwardly extending prongs at the smallest end, the shell being split longitudinally so that its marginal portions can be overlapped, both portions of the shell having peripherally arranged pressed perforations extending from the shell, the metal from the perforations being pressed to a side to form lips or tongues adapted to engage in the perforations formed in the opposite portions of the shell and thereby hold the shell contracted when the portions are overlapped.

10. A piston ring compressor as claimed in claim 9, having the lips or tongues formed at the smallest part of the shell and also at the widest part of the shell.

11. A piston ring compressor comprising a tapered shell having outwardly bent guiding lugs at its widest end and having inwardly bent prongs at its lower end, the said prongs being embossed to provide reinforcement, the shell being split longitudinally so that its marginal portions can be overlapped, a series of lips or tongues formed integral with the two portions of the shell pressed outwardly and inwardly respectively extending from a position adjacent the split, said lips or tongues being adapted to inter-lock when the portions of the shell are overlapped and thereby hold the shell contracted to compress the piston rings.

12. A piston ring compressor as claimed in claim 11 having a series of lips or tongues formed at the smallest part of the shell and a second set at the widest part of the shell, the tongues at the smallest part of the shell being of greater length than at the widest part.

In testimony whereof I have signed my name to this specification.

HENRY C. PHELPS.